(12) United States Patent
Neser et al.

(10) Patent No.: US 10,728,536 B2
(45) Date of Patent: Jul. 28, 2020

(54) SYSTEM AND METHOD FOR CAMERA COMMISSIONING BEACONS

(71) Applicant: UBICQUIA IQ LLC, Melbourne, FL (US)

(72) Inventors: Morne Neser, Lachine (CA); Gleb Geguine, Montreal (CA)

(73) Assignee: UBICQUIA IQ LLC, Melbourne, FL (US)

(*) Notice: Subject to any disclaimer, the term of this patent is extended or adjusted under 35 U.S.C. 154(b) by 0 days.

(21) Appl. No.: 16/198,152

(22) Filed: Nov. 21, 2018

(65) Prior Publication Data

US 2020/0162724 A1    May 21, 2020

(51) Int. Cl.
*H04N 17/00* (2006.01)
*G01S 19/01* (2010.01)
*G06T 7/80* (2017.01)

(52) U.S. Cl.
CPC .......... *H04N 17/002* (2013.01); *G01S 19/01* (2013.01); *G06T 7/80* (2017.01); *G06T 2207/30208* (2013.01)

(58) Field of Classification Search
CPC .................... H04N 17/002; G06T 7/80; G06T 2207/30208; G01S 19/01
USPC ........................................................ 348/187
See application file for complete search history.

(56) References Cited

U.S. PATENT DOCUMENTS 7,845,560 B2    12/2010  Emanuel et al.
9,595,109 B1*    3/2017  Umakhanov ......... G06T 7/0042
2010/0017178 A1*  1/2010  Tsuk ....................... G01B 11/24
                                                            703/6
2014/0247280 A1*  9/2014  Nicholas ............... G06T 19/006
                                                            345/633
2016/0217624 A1*  7/2016  Finn ..................... G01C 15/002
2017/0323129 A1   11/2017  Davidson et al.

FOREIGN PATENT DOCUMENTS

KR         101776823 B1    9/2017
KR       1020180116696 A   10/2018
WO         2016065623 A1    5/2016

OTHER PUBLICATIONS

International Search Report and Written Opinion dated Oct. 29, 2019 which was issued in connection with PCT Application No. PCT/US19/42105 which was filed on Jul. 17, 2019.

* cited by examiner

*Primary Examiner* — Michael Lee
(74) *Attorney, Agent, or Firm* — Seed IP Law Group LLP

(57) ABSTRACT

Provided is a system for optimizing geo-location of digital images captured in a stationary camera. The system includes a camera configured for capturing a digital image within a field of view of the camera, the image being representative of pixel coordinates and a beacon system including a (i) geo-positioning device for determining geo-coordinates of the device and (ii) a plurality of optical markers. The geo-coordinates are established for each of the markers relative to the geo-coordinates of the device. The beacon system is configured for positioning within the field of view. Also included is a matrix module for creating a transformation matrix for correlating one of more of the pixels with the geo-coordinates of each of the markers, the correlating producing geo-coordinates for the one of more pixels.

20 Claims, 4 Drawing Sheets

SYSTEM AND METHOD FOR CAMERA COMMISSIONING BEACONS

TECHNICAL FIELD

The present invention relates to commissioning stationary cameras for an initial use. More specifically, the present invention relates to using a combination of techniques to calibrate stationary cameras to produce more accurate geo-position information.

BACKGROUND OF THE INVENTION

Advancements in digital technologies greatly enhance performance of devices and services to improve the well-being of community citizens. Many of these advancements include systems that rely on the use of sensors to monitor circumstances in specific geographic locations. Intelligent data produced by these sensors (e.g., thermometers, cameras) and correlated with their specific locations, is integrated with tools able to determine when problems arise at these unique locations. The tools enable users to make informed decisions to mitigate the problems or enhance their environment.

Various combinations of sensors can be used to monitor existing or future problems (i.e., water, air and noise pollution, traffic). For example, sensing devices, such as video cameras, can be installed on lampposts along streets to monitor various pedestrian and automobile traffic conditions. When accurately correlated with specific geo-locations, this data provides intelligent information to cities and to the customers about detecting vehicles, parking availability, monitoring traffic anomalies, and detecting other problematic events. Accordingly, having these anomalies and events accurately reported in terms of their geo-location can be critical.

By way of example, a suspicious car parked along a street may be detected via a stationary (outdoor) video camera and may need to be reported to community authorities. In this instance, the location of the parked car must be autonomously reported with high accuracy (e.g., within a few feet).

To achieve this accuracy, the system must be capable of locating physical points (i.e. pixel coordinates) of interest within the camera's field of view, then finding the physical geo-location coordinates (e.g., latitude/longitude) of each of the points. Conventional approaches for locating these physical points and correlating these points with geo-location coordinates can be a time-consuming process.

For example, one conventional approach includes a manual process of identifying points of interest in a camera image and locating positions of corresponding points in the physical field of view, on maps, or on satellite images. This conventional manual approach, however, is not suitable for quickly and accurately obtaining him geo-location latitude and longitude of points of reference along the streets. This shortcoming is especially pronounced in cities including multiple high-rise buildings that may diminish the accuracy of the geo-location device.

SUMMARY OF THE EMBODIMENTS

Given the aforementioned deficiencies, a need exists for methods and systems that eliminate the need to manually identify and measure the locations of points of interest on an image in the camera's field of view. Additionally, methods and systems are needed that greatly reduce the time and effort required during camera commissioning and for using techniques that include collecting coordinate pairs. In other words, intelligence must be built into systems for performing video analytics and image recognition that can be correlated with geo-location.

In one exemplary embodiment, a system for optimizing geo-location of digital images captured in a stationary camera is provided. The system includes a camera configured for capturing a digital image within a field of view of the camera, the image being representative of pixel coordinates and a beacon system including a (i) geo-positioning device for determining geo-coordinates of the device and (ii) a plurality of optical markers. The geo-coordinates are established for each of the markers relative to the geo-coordinates of the device. The beacon system is configured for positioning within the field of view. Also included is a matrix module for creating a transformation matrix for correlating one of more of the pixels with the geo-coordinates of each of the markers, the correlating producing geo-coordinates for the one of more pixels.

The embodiments provide a technique to obtain high accuracy mathematical geo-location of pixel coordinates especially in dense city areas. It also provides techniques to obtain underlying calculation of parameters to obtain the coordinates.

Embodiments of the present invention provide a mobile beacon unit including a high precision geo-positioning device integrated with optical markers for identification by the camera. The purpose of this unit is to assist in commissioning process of stationary outdoors video cameras. Data is collected for calculating a transfer function between camera image coordinates and physical position coordinates of points in the cameras field of view. The underlying calculations of this process are referred to as homography.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION OF THE EMBODIMENTS

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
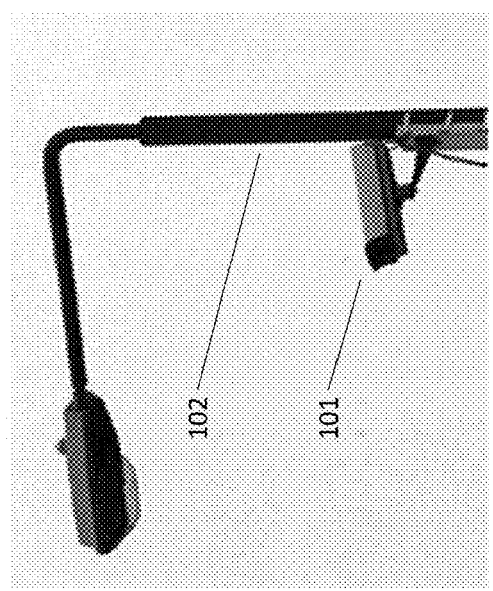
FIG. 1 is an illustration of a camera commissioning beacon system according to a first embodiment of the present invention.
Figure 1:
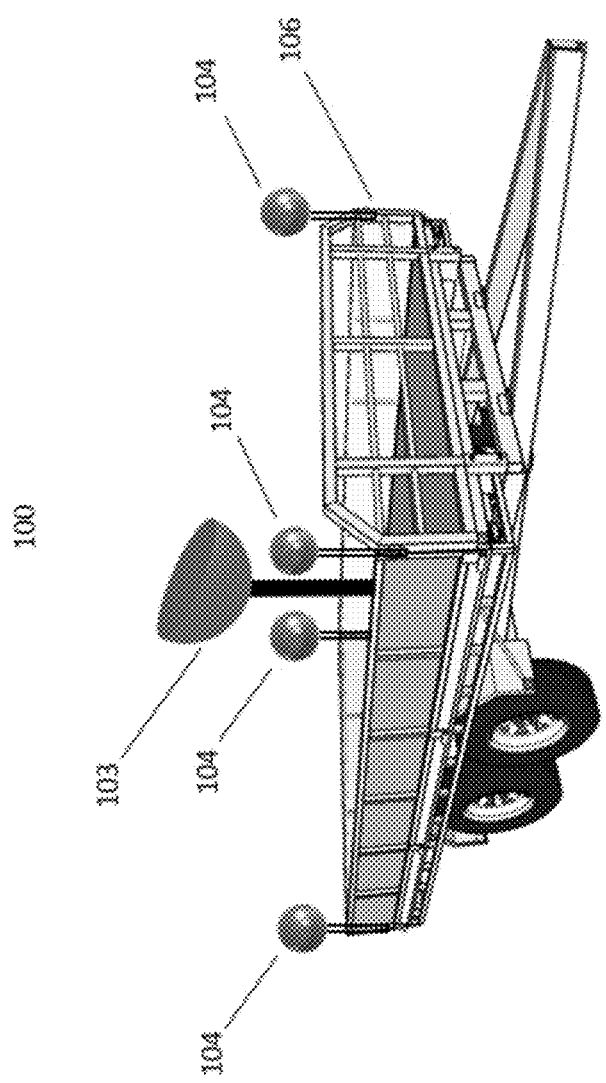

FIG. 1 is an illustration of a camera commissioning beacon system 100 according to a first embodiment of the present invention. The beacon system 100 is constructed to assist in the commissioning of a network (not shown) of video cameras (or a single camera), such as outdoor video camera 101 mounted on lamppost 102.

The commissioning beacon system 100 includes a high precision geo-positioning device 103 integrated with optical markers 104A-104D for identification by the camera 101. The beacon system 100 can be mounted on a mobile platform, such as the trailer 106. During operation, the beacon system 100 is used to simplify the process of finding the physical location of images identified by the camera 101.

By way of example, this process includes creating a mapping between a pixel location of digital images within the field of view of the camera 101 and the actual physical geo-location of these images with respect to their latitude and longitude.

In accordance with the embodiments, an exemplary mapping process includes calibrating all cameras, within the network of cameras, individually. The exemplary beacon system 100 of FIG. 1 provides a set of four optical three-dimensional (3D) markers (e.g., spherical points) 104A-104D that provide an easily identifiable point of interest for future digital images produced by the camera 101.

That is, the optical markers 104A-104D are useful to provide four mathematically corresponding points (i.e., real world latitude and longitude) correlating to pixels of a digital image of an object within the field of view of the camera 101. In the exemplary beacon system 100 the markers 104A-104D are spherically shaped, although the present invention is not so limited. By way of background, markers such as prominently colored spheres, may be particularly useful as a point of interest. Prominent colors are usually preferred because they make the point of interest easily identifiable.

Further, spheres have the advantage of being orientation invariant, which simplifies the autonomous detection process. The present invention, however, is not limited to prominently colored objects, nor is it limited to objects shaped as spheres.

For example, two-dimensional (2D) augmented reality (AR) codes and quick response (QR) codes, among others, may also form suitable markers. In the case of 2D markers, the geo-orientation of the marker should also be recorded to differentiate the individual points. Different marker types can be selected according to user preferences. To optimize the process of collecting data and calculating the homography, the coordinates from the beacon and camera can be collected in real-time via wireless interface.

During commissioning, the trailer 106, carrying the beacon commissioning system 100, can be pulled within the field of view of each of the cameras (e.g., the camera 101) within a network of cameras. The latitude and longitude coordinates of each of the markers 104a-104d (beacons) can be accurately determined relative to the geo-positioning device 103.

By way of example, the geo-positioning device 103 can be implemented using the Global Positioning System (GPS), Global Navigation Satellite System (GNSS), or other suitable systems and methodologies. For example, a geo-positioning enabled mobile device, Wi-Fi, or other networks, may also be used to obtain accurate latitude and longitude of the markers 104a-104d.

After determining the latitude and longitude of the markers 104a-104d, a transformation matrix representing a calibration parameter for the stationary camera 101 is created. The calibration parameter is used to derive the geo-location latitude and longitude for pixels of digital images within the field of view of the camera 101 from the known latitude and longitude of the markers 104a-104d. Accordingly, when an object (e.g., a pedestrian, a vehicle, or other object) is detected as an image of the camera 101, the transformation with the matrix can be used to determine the object's corresponding latitude and longitude, derived as a mathematical function of the geo-location of the markers 104a-104d. This process is discussed in greater detail with reference to FIG. 2 below.

Figure 2:
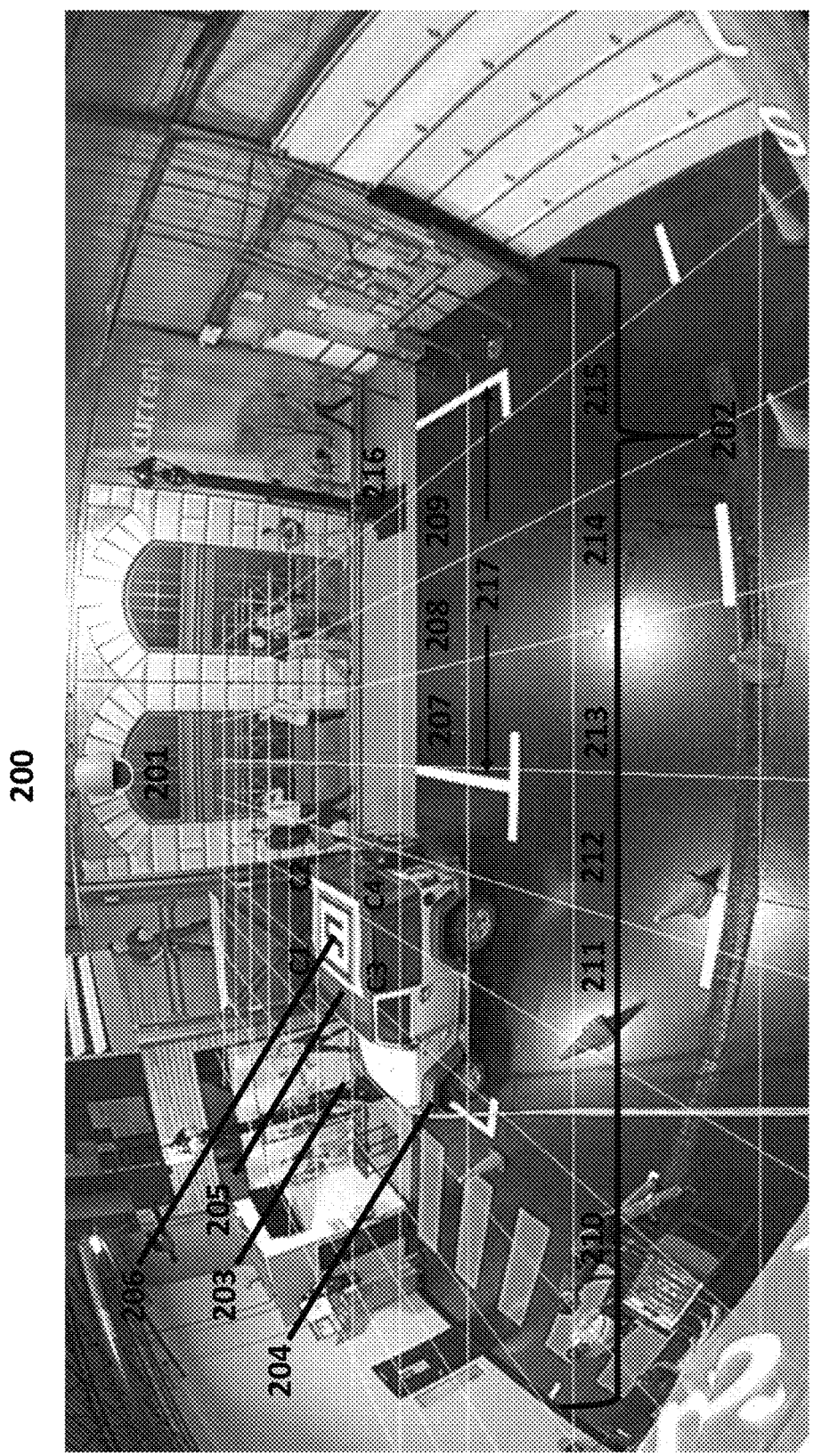
FIG. 2 illustrates a camera commissioning beacon system according to a second embodiment of the present invention.

FIG. 2 is an illustration of an exemplary digital image 200 of a typical city street populated by pedestrians, traffic cones, vehicles, and other objects typically associated with a busy city street. The digital image 200 was identified within a field of view 202 of a camera 201. Also depicted in FIG. 2 is a beacon commissioning system 203 constructed according to a second embodiment. An actual city street can include a plurality of cameras, such as the camera 201.

The beacon commissioning system 203 includes a vehicle 204 having a banner 205 positioned thereon. The banner 205 includes an optical marker 206 formed of four corners (i.e. beacons) C1-C4 of a printed QR code. Also included (not shown) is a GPS or GNSS enabled device. The device records the geo-coordinates of the beacon related to time. At the same time an image from the camera is recorded with a time-stamp. The inventors have discovered that a banner of about 3-4 feet, or other reasonable size, would be suitable for use to house a printed optical marker, according to the embodiments.

In FIG. 2, the field of view 202 of the camera 201 is demarcated to include a plurality of sectors, such as sectors 207-216. For example, within the field of view 202 is a traffic cone within the sector 211, a streetlamp within the sector 216, and a person standing within the sector 210. Additionally, the sectors 207-209 form a parking space 217.

During commissioning (e.g., the initial operation), via the vehicle 204, the beacon commissioning system 203 can be rolled within the field of view of all cameras within a network of cameras along the street, including the camera 201. In other words, each camera is commissioned individually for locations within its corresponding field of view. In addition to each camera being separately commissioned, the geo-stationary location of each of the beacons C1-C4 would be determined, relative to the geo-positioning device.

The beacons C1-C4 are used as mathematical marker locations to calculate the matrix for transforming from pixel coordinates to latitude/longitude coordinates. Desirably, at least four beacons are to provide four distinct pairs of x.y, coordinate pixels and latitude longitude positions. As noted above, during the initial commissioning and set-up, this process would need to be performed for each of the marker locations C1-C4. The four locations C1-C4 could be calibrated sequentially, or all of the locations could be done simultaneously. A software routine is used to identify the coordinates of the optical marker in this image. These coordinate pairs are then used to calculate the transfer functions between the different coordinate system.

By way of example, the software routine is configured to convert the pixel coordinates to latitude/longitude (geo-location) coordinates. In one example, this conversion can be performed by a two-step process, as indicated as follows:

Step 1 (matrix multiplication, H represents the 3-by-3 homography matrix)

[pixel x, pixel y, 1] × [H] = [L1, L2, scaler]
e.g.
   [1636, 626, 1] ×   [−0.0208288463146246, 0.0740451597073943, −0.0006321632 ]
                     [−0.173949165775439, 0.618405413350275, −0.005279667    ]
                       [32.9478071855802, −117.129077930116, 1              ]
                = [−110.02028316057046, 391.1305921084532, −3.3392905372]

Step 2 (Normalization)

[L1, L2, scaler]/scaler=[latitude, longitude, 1]

e.g.

[−110.02028316057046, 391.1305921084532,
   −3.3392905372]/−3.3392905372=
   [32.94720298666274, −117.1298477180176, 1]

After the exemplary calculation of steps 1 and 2 above, as understood by those of skill in the art, the homography matrix can be calculated using available open-source or other publicly available libraries and resources.

In other embodiments, different marker types might be employed. Also, different positioning systems may be utilized. Local area positioning relative to the camera may be referenced instead of geo-coordinates. A different transformation method than 2D homography may be used where more or fewer coordinate pairs can be required.

Still other embodiments can use local position relative to the camera instead of geo-coordinates as a reference to physical position. Predefined position and orientation of the camera could also be used to infer geo-coordinates from local relative coordinates. In yet additional embodiments, software for marker detection and transformation calculations may be performed at different potential locations, for example, on an engineering station, server in the back-end cloud, or on a processor located at the camera.

In a simplified embodiment, (a) the father apart the location pairs are, the more accurate the homography can be calculated, (b) four location pairs are preferred to be linear independent (i.e. no 3 points in a straight line), and (c) a moving GPS tends to have better position accuracy in urban areas (since it averages out errors due to signal reflections etc.).

One exemplary approach to acquiring four good location pairs include the following scenario. For example, a vehicle with a single marker/beacon and a GPS module may drive past the camera twice, using different road lanes, e.g. in opposite directions. The mobile system can record at least two positions in the camera's field per trip at precise timestamps. Recorded images from the camera at these timestamps can be analyzed (in camera processor or remotely/centralized) for finding the corresponding marker pixel coordinates. An added benefit of this approach is that the vehicle speed can be used for calibration/validation of the accuracy.

Figure 3:
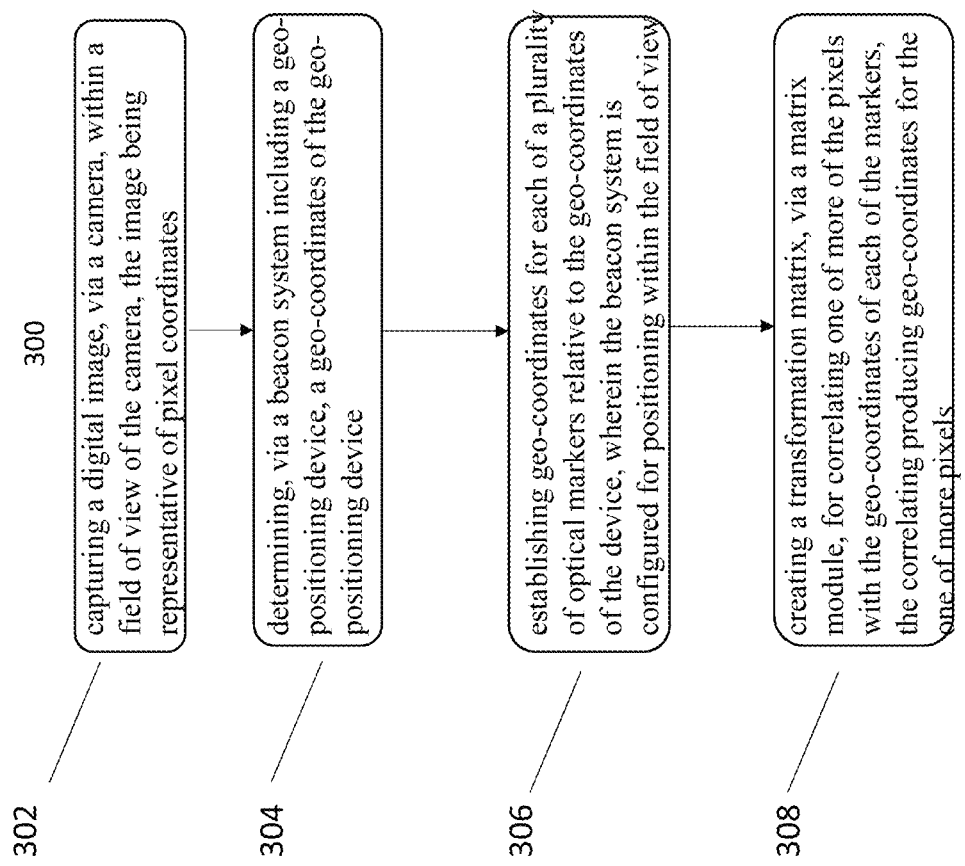
FIG. 3 is an illustration of an exemplary method of practicing an embodiment of the present invention.

FIG. 3 is an illustration of an exemplary method 300 of practicing an embodiment of the present invention. In block 302, the method 300 includes capturing a digital image, via a camera, within a field of view of the camera, the image being representative of pixel coordinates and determining, via a beacon system including a geo-positioning device, a geo-coordinates of the geo-positioning device in block 304.

In block 306, the method continues by establishing geo-coordinates for each of a plurality of optical markers relative to the geo-coordinates of the device, wherein the beacon system is configured for positioning within the field of view.

The method concludes in block 308 by creating a transformation matrix, via a matrix module, for correlating one of more of the pixels with the geo-coordinates of each of the markers, the correlating producing geo-coordinates for the one of more pixels.

Figure 4:
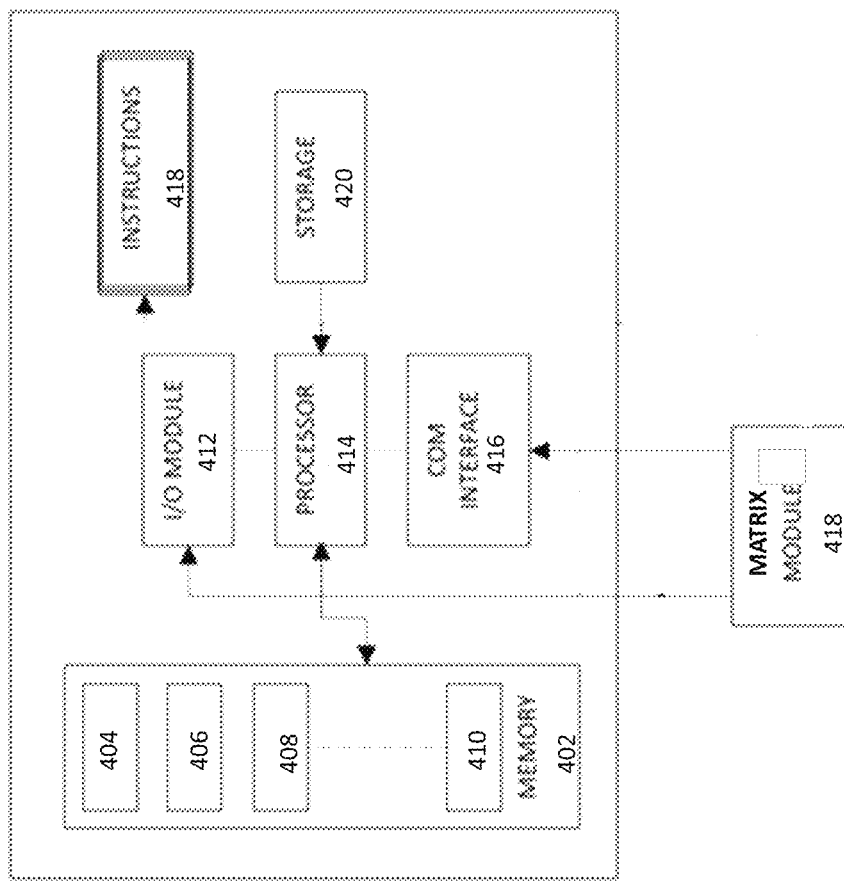
FIG. 4 illustrates an exemplary computer system on which the illustrious embodiments may be implemented.

FIG. 4 depicts a system 400 that includes an application-specific processor 414 configured to perform tasks specific to optimizing geo-location of digital images captured in a stationary camera. The processor 414 has a specific structure imparted by instructions stored in a memory 402 and/or by instructions that can be fetched by the processor 414 from a storage 420. The storage 420 may be co-located with the processor 414, or it may be located elsewhere and be communicatively coupled to the processor 414 via a communication interface 416, for example. Furthermore, in some embodiments, the system 400 may be part of a cloud-based computing infrastructure providing cloud-based computing services.

The system 400 can be a stand-alone programmable system, or it can be a programmable module located in a much larger system. For example, the system 400 be part of a distributed system configured to handle the various modules of the process 300 described above. The processor 414 may include one or more hardware and/or software components configured to fetch, decode, execute, store, analyze, distribute, evaluate, and/or categorize information. Furthermore, the processor 414 can include an input/output module (I/O module 412) that can be configured to ingest data pertaining to single assets or fleets of assets.

The processor 414 may include one or more processing devices or cores (not shown). In some embodiments, the processor 414 may be a plurality of processors, each having either one or more cores. The processor 414 can be configured to execute instructions fetched from the memory 402, i.e. from one of memory block 404, memory block 406, memory block 408, and memory block 410.

Furthermore, without loss of generality, the storage 420 and/or the memory 402 may include a volatile or non-volatile, magnetic, semiconductor, tape, optical, removable, non-removable, read-only, random-access, or any type of non-transitory computer-readable computer medium. The storage 420 may be configured to log data processed, recorded, or collected during the operation of the processor 414.

The data may be time-stamped, location-stamped, cataloged, indexed, or organized in a variety of ways consistent with data storage practice. The storage 420 and/or the memory 402 may include programs and/or other information that may be used by the processor 414 to perform tasks consistent with those described herein.

For example, the processor 414 may be configured by instructions from the memory block 406, the memory block 408, and the memory block 402, to perform score inspection tasks and associated analytics, as described above. The processor 414 may execute the aforementioned instructions from memory blocks, 406, 408, and 410, and output a twin digital model that is based on in-field performance test data and communicate the twin digital module to a manufacturing process system for subsequent fabrication of a new part that is optimized based on in-field conditions. Also included is a matrix module 418 for creating a transformation matrix described above with reference to FIG. 2.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A system for optimizing geo-location of digital images captured in a stationary camera, the system comprising:
   a camera configured for capturing a digital image within a field of view of the camera, the image being representative of pixel coordinates;
   a beacon system including a (i) geo-positioning device for determining geo-coordinates of the device and (ii) a plurality of optical markers, wherein geo-coordinates are established for each of the markers relative to the geo-coordinates of the device, the geo-positioning device and plurality of optical markers being integrated with and mounted on a mobile platform;
   wherein the beacon system is configured for positioning within the field of view; and
   a matrix module for creating a transformation matrix for correlating one of more of the pixels with the geo-coordinates of each of the markers, the correlating producing geo-coordinates for the one of more pixels.

2. The system of claim 1, wherein the camera is stationary.

3. The system of claim 2, wherein the camera is one of a plurality of cameras positioned along a pathway.

4. The system of claim 1, wherein the optical marker is 3D.

5. The system of claim 4, where in the optical marker is a sphere.

6. The system of claim 1, wherein the optical marker is 2D.

7. The system of claim 6, where in the optical marker is at least one selected from the group consisting of an AR Code and a QR Code.

8. The system of claim 1, wherein the geo-positioning device comprises at least one selected from the group consisting of a GPS system and a GNSS system.

9. A method for optimizing geo-location of digital images captured in a stationary camera, the system comprising:
   capturing a digital image, via a camera, within a field of view of the camera, the image being representative of pixel coordinates;
   determining, via a beacon system including a geo-positioning device, geo-coordinates of the geo-positioning device;
   establishing geo-coordinates for each of a plurality of optical markers relative to the geo-coordinates of the device, the geo-positioning device and plurality of optical markers being integrated with and mounted on a mobile platform;
   wherein the beacon system is configured for positioning within the field of view; and
   creating a transformation matrix, via a matrix module, for correlating one of more of the pixels with the geo-coordinates of each of the markers, the correlating producing geo-coordinates for the one of more pixels.

10. The method of claim 9, wherein the optical marker is 3D.

11. The method of claim 10, where in the optical marker is a sphere.

12. The method of claim 9, wherein the optical marker is 2D.

13. The method of claim 12, where in the optical marker is at least one from the selected group consisting of an AR Code and a QR Code.

14. The method of claim 9, wherein the geo-positioning device comprises at least one selected from the group consisting of a GPS system and a GNSS system.

15. A tangible computer readable medium having instructions stored therein, wherein when executed, the instructions cause a computer processor to perform a method including:
   capturing a digital image, via a camera, within a field of view of the camera, the image being representative of pixel coordinates;
   determining, via a beacon system including a geo-positioning device, geo-coordinates of the geo-positioning device;
   establishing geo-coordinates for each of a plurality of optical markers relative to the geo-coordinates of the device, the geo-positioning device and plurality of optical markers being integrated with and mounted on a mobile platform;
   wherein the beacon system is configured for positioning within the field of view; and
   creating a transformation matrix, via a matrix module, for correlating one of more of the pixels with the geo-coordinates of each of the markers, the correlating producing geo-coordinates for the one of more pixels.

16. The computer readable medium of claim 15, wherein the optical marker is 3D.

17. The computer readable medium of claim 16, where in the optical marker is a sphere.

18. The computer readable medium of claim 15, wherein the optical marker is 2D.

19. The computer readable medium of claim 18, where in the optical marker is at least one selected from the group consisting of an AR Code and a QR Code.

20. The computer readable medium of claim 15, wherein the geo-positioning device comprises at least selected one from the group consisting of a GPS system and a GNSS system.

* * * * *